No. 880,937. PATENTED MAR. 3, 1908.
L. THORTVEDT.
DITCHING MACHINE.
APPLICATION FILED JUNE 20, 1907.
2 SHEETS—SHEET 1.
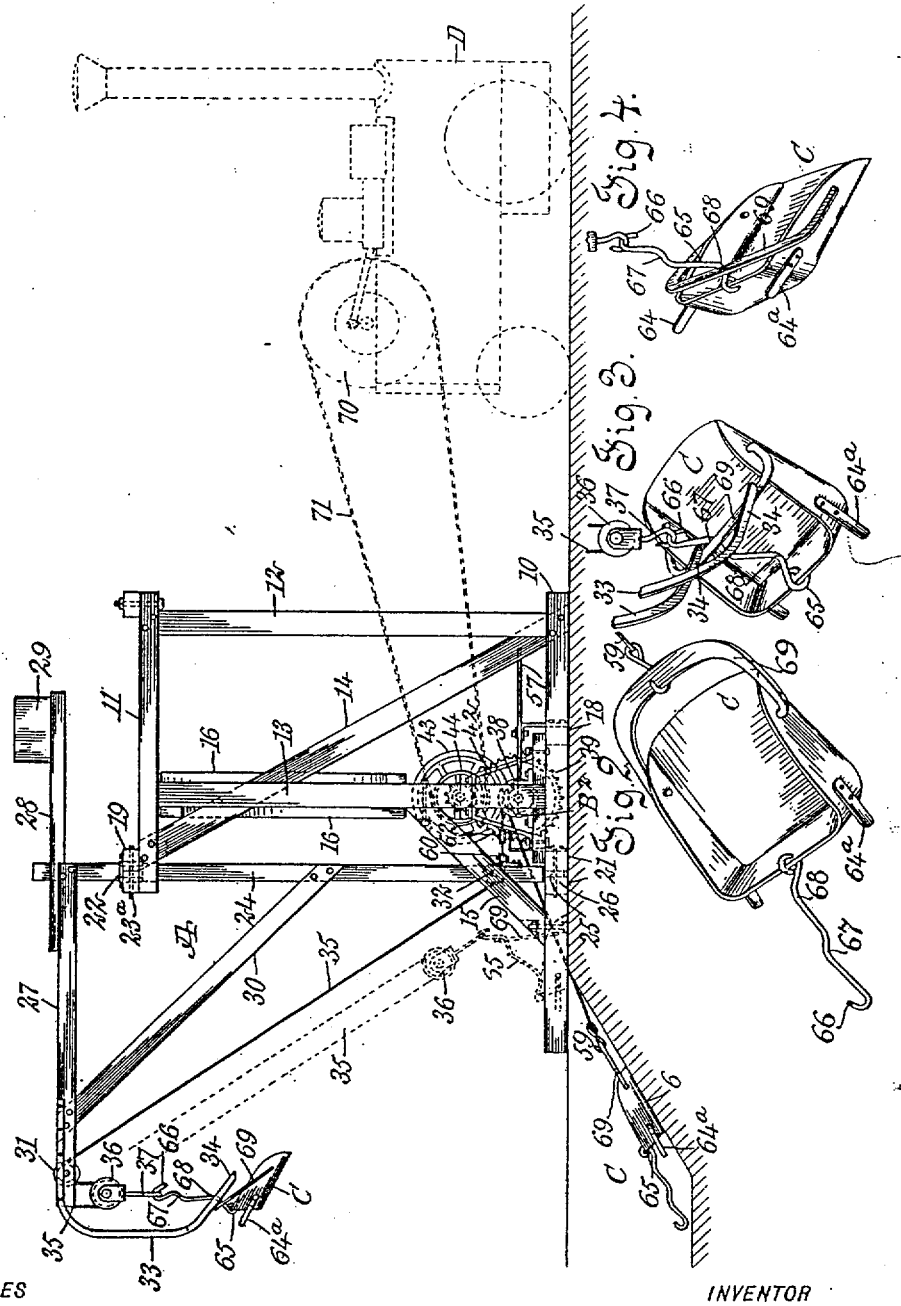
WITNESSES
INVENTOR
Levi Thortvedt
BY Munn & Co.

No. 880,937. PATENTED MAR. 3, 1908.
L. THORTVEDT.
DITCHING MACHINE.
APPLICATION FILED JUNE 20, 1907.
2 SHEETS—SHEET 2.
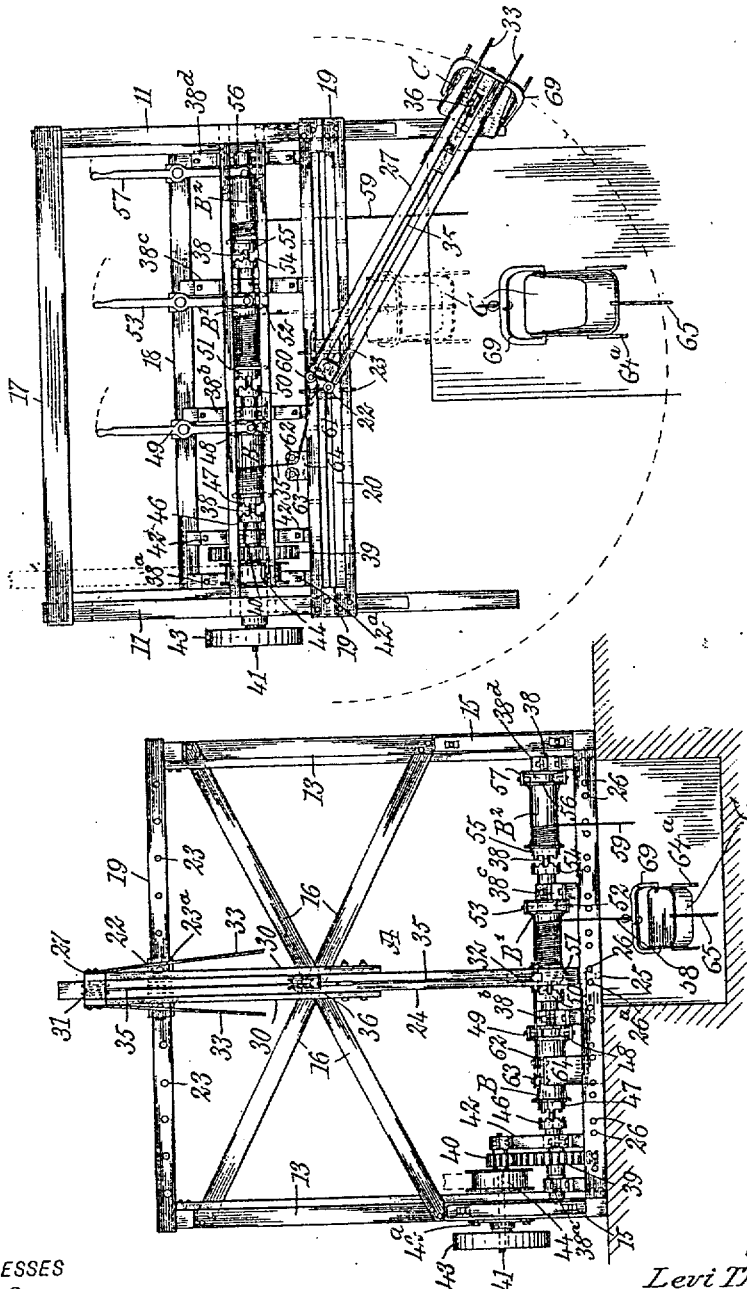
WITNESSES
INVENTOR
Levi Thortvedt
BY Munn & Co.
ATTORNEYS

UNITED STATES PATENT OFFICE.

LEVI THORTVEDT, OF GLYNDON, MINNESOTA.

DITCHING-MACHINE.

No. 880,937.  Specification of Letters Patent.  Patented March 3, 1908.

Application filed June 20, 1907. Serial No. 379,906.

*To all whom it may concern:*

Be it known that I, LEVI THORTVEDT, a citizen of the United States, and a resident of Glyndon, in the county of Clay and State of Minnesota, have invented a new and useful Improvement in Ditching-Machines, of which the following is a full, clear, and exact description.

The purpose of the invention is to provide a very light yet simple form of ditching machine adapted to be drawn or driven by a steam or other motor, and to provide the driving shaft with a hoisting capstan, and one or more drag capstans that assist in the filling of the shovels or scrapers to be hoisted, which drag capstans are independent of the hoisting capstan.

It is also a purpose of the invention to provide means for independently bringing each capstan in driven relation to the driving shaft, and for regulating the rapidity of motion of the capstans if revolved when not coupled to the driving shaft; and another purpose of the invention is to provide a pivoted crane so mounted that it can be adjusted to a position in front of any of the capstans and be held in adjusted position, and further to provide means carried by the jib of the crane and coöperating suspension and draft mechanisms for the scrapers or shovels, whereby to automatically dump a loaded shovel or scraper when the latter has been elevated to a given height.

Another purpose of the invention is to provide a machine in connection with which any form of scraper may be employed, and to so construct the machine that it can be used for ditching ground too soft to be worked over by horses, and so that a ditch can be dug to any desired depth.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a side elevation of the improved ditching machine; Fig. 2 is a perspective view of the shovel or scraper, illustrating the position of its suspension and drag mechanism while the scraper or shovel is being loaded; Fig. 3 is a perspective view of the scraper or shovel illustrating its suspension and drag mechanism in position to be tripped for dumping; Fig. 4 is a perspective view of the shovel or scraper, illustrating the position of its suspension and drag mechanism when the scraper or shovel is in dumping position; Fig. 5 is a front elevation of the complete machine; and Fig. 6 is a plan view of the same.

The frame of the machine may be of any desired dimensions and of any approved construction; as illustrated, it consists of lower side beams 10, upper side beams 11, the lower side beams extending in advance of the upper side beams, uprights 12 and 13 that connect the upper and lower beams at the rear and front of the machine, side braces 14 and 15, and preferably cross braces 16 located at the front, connecting the forward uprights 13, as is best shown in Fig. 5. In the further construction of the frame, an upper rear cross bar or beam 17 is employed extending from one upper side beam 11 to the other, and a lower cross beam or bar 18 is made to connect the lower side beams or sills 10 adjacent their rear ends, as is illustrated in Figs. 1 and 6. Parallel and engaging cross bars 19 are secured at their ends to the forward end section of the upper side beams 11, and between the said parallel bars 19, an opening 20 is formed that extends nearly from end to end of the said cross bars, as is best shown in Fig. 6, and corresponding cross bars 21 are located at the bottom portion of the frame connecting the lower side sills or beams 10, as is shown in dotted lines in Fig. 1, a space being made also to intervene the said lower cross bars 21. The upper cross bars 19 and the corresponding lower cross bars 21 may be termed guide bars since they are employed to guide the movement of the mast 24 for the crane A. This mast 24 at its upper portion is mounted to turn and has limited sliding movement in a block 22, which block is mounted to slide in the space or opening 20 between the upper guide bars 19, and this block 22 is held in any desired position the length of the slot or opening 20 by means of pins 23ª that are passed through openings or apertures 23 in the said guide beams 19 and through corresponding openings in the bearing block 22, as is illustrated best in Figs. 1 and 5. The lower end of the mast 24 of the crane A is preferably provided with a metal tenon or pin 25 and this tenon has sliding movement in the space between the lower guide bars 21, as is shown in dotted lines in Figs. 1 and 5, and the lower end of the mast of the crane A is held in adjusted position relatively to the lower guide bars 21 by pins 26ᵃ passed through apertures 26 in the said lower guide bars, one at each side of the tenon of the mast as is illustrated particularly in Fig. 5. Thus it will be observed that the mast of the crane A is free to turn no matter where it may be adjusted in the length of the openings between the upper and lower guide bars 19 and 21.

The mast 24 of the crane A at its upper end is provided with an outwardly extending jib 27 that is rigidly secured to the said mast above the frame of the machine, and at the rear portion of the jib a beam 28 is attached that extends rearwardly over the frame of the machine, and the said beam 28 is provided with a box 29, or its equivalent, adapted to hold weights, the object of this out-rigging 28 being to counterbalance the weight carried by the jib 27 and thus admit of the crane turning more readily than it otherwise would. A brace bar 30 extends from the jib 27 outward to the mast 24 of the crane A, and adjacent the outer end of the jib 27 a pulley 31 is mounted in the said jib, as is shown in Figs. 1 and 5. Trip arms 33 are attached, one to each side of the jib 27 at its outer or forward end, and these arms are carried outward from the jib and then downward, diverging at their lower ends 34, and the said lower end portions of the trip arms 33 are inclined downward and inward, or in direction of the frame of the machine, as is best shown in Fig. 1.

A hoisting rope 35 is secured at one end of the end portion of the jib 27, and this hoisting rope 35 is passed over the tackle block 36 supporting the same, and thence over the guide pulley 31 in the jib, and the said tackle block 36 is provided with pendent hook 37, or its equivalent. After the hoisting rope 35 has passed the guide pulley 31 it is carried down and passed over a guide pulley 32 that is pivoted in the mast near its lower end, as is shown also in Figs. 1 and 5, and from thence the hoisting rope is carried to mechanism to be hereinafter described.

A drive shaft 38 is mounted upon the base of the frame in bearings designated as 38ᵃ, 38ᵇ, 38ᶜ and 38ᵈ reading from the right to the left-hand side of the frame. At the right-hand end portion of the said drive shaft within the frame, a gear 39 is secured thereto, and this gear meshes with a pinion 40 secured upon a shaft 41 above and parallel with the drive shaft 38, being located at the right-hand portion of the frame and mounted to turn in an inner bearing 42 and an outer bearing 42ᵃ, as is shown in Fig. 5. A fly wheel 43 is located at the outer end of the shaft 41 and on the said shaft 41 a driving pulley 44 is secured. To the left of the inner bearing 42 for the shaft 41, a clutch 46 is secured upon the drive shaft 38, and opposite this clutch a capstan B is loosely mounted on the said drive shaft and has a sliding movement thereon, and at the right-hand end of the capstan B a clutch face 47 is produced, adapted when the capstan is to be turned to engage with the clutch 46 on said drive shaft. At the left-hand end portion of the capstan B a groove 48 is formed, which receives the forked end of a shifting lever 49, the said lever being suitably fulcrumed over the rear lower cross bar 18, as is best shown in Fig. 6. The capstan B extends to the bearing 38ᵃ when its clutch face is out of engagement with the clutch 46. At the opposite or left-hand side of the said bearing 38ᵇ a second clutch 50 is secured on the said drive shaft 38, and to the left of this clutch 50 and between said clutch and the bearing 38ᶜ, a second capstan B′ is mounted to loosely turn and slide on the said drive shaft, and this capstan B′ is provided at its right-hand end with a clutch face 51 for engagement with the clutch 50 when the capstan B′ is to be revolved, and the said capstan B′ is provided at its left-hand end portion with a groove 52, that receives the fork of a shifting-lever 53, also fulcrumed above the rear cross-bar 18 of the frame. A third capstan B² is mounted to turn and slide on the said drive shaft 38, and this latter capstan B² is located between a clutch 54, which is secured to the shaft 38 at the left-hand side of the bearing 38ᶜ, and the extreme left-hand bearing 38ᵈ, as is shown in Figs. 5 and 6. The capstan B² is provided at its right-hand end with a clutch-face 55 adapted to engage, when the said capstan B² is to be driven, with the clutch 54 of the drive-shaft 38, and at the left-hand end portion of the capstan B² a groove 56 is formed, that receives the forked end of a third shifting lever 57, also fulcrumed above the rear lower cross-bar 18 of the frame. These shifting-levers 49, 53 and 57 are therefore located together and can be readily managed by one individual, and it will be observed that each capstan is capable of independent movement, brought about by the movement of its controlling lever. When the capstan is brought in engagement with the clutch on the drive-shaft, the capstan is revolved, and when the capstan is released from its drive clutch by means of its controlling lever, the capstan can be made to engage with the bearing adjacent its left-hand end, and by means of the frictional contact thus obtained the degree to which the capstan shall turn when free is under complete control.

A drag-rope 58, provided with a suitably attached hook, is adapted to be wound upon or unwound from sundry of the capstans. At the rear of the mast 24 of the crane A, just opposite the guide-pulley 32, two smaller guide-pulleys 60 and 61 are mounted in horizontal alinement, as is shown in Fig. 6, and opposite the capstan B two other horizontally-alining guide-pulleys 62 and 63 are suitably mounted upon a bracket 64, which bracket 64 is usually secured to and extends up from the rear edge of the rearmost lower guide-bar 21, as is shown in Fig. 1, and the hoisting rope 35, after passing through the guide-pulley 32 in the mast of the crane, is made to engage with either of the guide-pulleys 60 or 61, according to the direction in which the crane is to be turned in dumping, and then engages with either one of the auxiliary guide-pulleys 62 or 63, and from thence the said hoisting rope or cable 35 is carried and attached to the capstan B, for example, when that capstan is used for hoisting purposes and the crane is some distance therefrom.

The shovel or scraper C may be of any approved type, and is provided at its rear with the customary handles, 64$^a$, and at the central portion of the rear or closed end of the scraper or shovel C a combined suspension and drag-bar 65 is pivotally attached, and this combined suspension and drag-bar is provided with a hook 66 at its upper or free end, and intermediate these ends is provided with two shoulders 67 and 68, the shoulder 68 being adjacent the point where the said combined suspension and drag bar is connected with the body of the shovel or scraper, as is shown in Figs. 2, 3 and 4, and the shovel or scraper employed is also provided with what I term a trigger-bail 69, that is pivotally mounted in the sides of the shovel or scraper, as is also shown in Figs. 2, 3 and 4, and the bow portion of the said trigger-bail 69, in the lifting position of the combined suspension and drag bar, engages with the upper shoulder 67 and serves to hold the shovel or scraper in somewhat of a horizontal position but with a slight rearward inclination, and when the shovel or scraper is in dumping position the trigger-bail 69 engages with the lower shoulder 68, as is shown in Fig. 4.

In the operation of this machine, as stated, the crane can be adjusted so as to be brought in front of or opposite any one of the capstans. When it occupies a central position relatively to the frame, as is shown in Figs. 5 and 6, the jib of the crane can be swung to either side of the machine for dumping purposes. Supposing a shovel or scraper to have been loaded, the combined suspension and drag bar 65 is made to engage with the hook 37 extending from the tackle-block 36 or capstan to which the hoist rope is attached, and then the hoisting capstan is brought in engagement with its clutch, turning the capstan in direction to wind the hoisting rope 35 thereon, and when the loaded shovel or scraper is swung upward sufficiently far for its trigger-bail 69 to engage with the downwardly and forwardly curved lower portions 34 of the trip-arms 33, the trigger-bail 69 is carried from engagement with the shoulder 67 with which it was in engagement, and is forced to drop to an engagement with the lower shoulder 68, as is shown in Figs. 1 and 4, thus permitting the open end of the shovel to incline downward and to spill the earth therefrom, the crane having been suitably swung previous to the said automatic dumping operation.

During the time that a loaded shovel is being hoisted, an empty shovel is attached to one or the other, or both, of the drag-ropes 58, and the capstans to which the said ropes are attached are primarily free from their clutches so as to permit the empty shovel to drop down in a ditch; then the capstans with which the empty shovels are connected are set in operation by the shaft 38, through the engagement of the clutch-faces with the opposing clutches on the shaft, and in this manner the shovels receive their load as they are drawn up from the ditch. When a shovel is loaded the trigger-bail 69 of the shovel is made to engage with the upper shoulder 67 of the combined suspension and drag bar, and then the combined suspension and drag bar is ready to be attached to the hoisting cable.

A motor D of any approved type is attached in any suitable or approved manner at the rear of the frame, the forward portion of the frame extending over the forward end of the ditch, as is shown in Fig. 1. The pulley 70 on the driving-shaft of the said motor is connected by a belt 71 with the driving-pulley 44 of the shaft 41 of the machine; thus the motor is used for driving the shaft 38 and likewise for moving the machine from place to place.

Any capstan may be used as a hoisting capstan, and likewise any capstan may be used as a drag capstan; preferably, however, the capstan just behind the engine is connected with the hoist rope. When a shovel is to be filled a hook on a drag rope 59 is engaged with the trigger-bail 69. I desire it to be understood that any form of clutch can be employed as, for example, a friction clutch or the like.

Having thus descrbed my invention, I claim as new and desire to secure by Letters Patent,—

1. In a ditching machine, a drive shaft, a series of independent capstans mounted to rotate and slide thereon, and independent means for locking or unlocking the capstans relatively to the shaft, and a crane adjustable opposite any one of the capstans.

2. In a ditching machine, a drive shaft, a hoisting capstan and a drag capstan mounted to slide and turn upon the drive shaft, independent clutch connections between the shaft and the capstans, an independent shifting device for each capstan and a laterally adjustable crane.

3. In a ditching machine, the combination with a drive shaft, of a hoisting capstan, and a drag capstan mounted to turn and slide upon the shaft, an independent coupling connection between each capstan and the drive shaft, shifting devices for the capstans, a crane provided with trip arms a hoisting cable carried by the crane, and connected with the hoisting capstan, and a drag cable connected to the drag capstan.

4. In combination, a drive shaft, independent capstans mounted for rotary and sliding movement upon the said shaft, an independent coupling between each capstan and the shaft, shifting devices for the capstans, and a crane mounted for adjustment to and from any of the capstans.

5. In combination, a drive shaft, independent capstans mounted for rotary and sliding movement upon the said shaft, an independent coupling for each capstan with the drive shaft, shifting devices for each capstan, a crane mounted for sliding movement to or from any of the capstans in a line parallel therewith, a hoisting rope carried by the crane and attached to one of the capstans and drag ropes connected with the other capstans.

6. In combination, a drive shaft, independent capstans mounted for rotary and sliding movement upon the said shaft, an independent coupling for each capstan with the drive shaft, shifting devices for each capstan, a crane mounted for sliding movement to or from any of the capstans in a line parallel therewith, a hoisting rope carried by the crane and attached to one of the capstans, and drag ropes connected with the other capstans, a shovel or scraper carried by the hoisting rope, and trip devices carried by the crane acting to automatically dump the hoisted shovel or scraper.

7. In a ditching machine, the combination with a drive shaft, a series of bearings therefor, and clutches upon the shaft opposite the bearings, of capstans independently mounted for rotary and sliding movement on the shaft between a clutch and a bearing, each capstan being provided with a clutch face, and means for independently shifting each capstan to or from engagement with a clutch on the shaft, or to and from engagement with an adjacent bearing for the shaft.

8. In a ditching machine, the combination with a drive shaft, a series of bearings therefor, and clutches upon the shaft opposite the bearings, of capstans independently mounted for rotary and sliding movement on the shaft between a clutch and a bearing, each capstan being provided with a clutch face, and means for independently shifting each capstan to or from engagement with a clutch on the shaft, or to and from engagement with an adjacent bearing for the shaft, a crane mounted for adjustment to a position opposite any of the capstans, a hoisting rope carried by the crane and attached to one of the capstans, guide pulleys for said hoisting rope, and drag ropes carried by the other capstans.

9. In a ditching machine, a crane, trip arms extending from the jib of the crane, a scraper or shovel adapted to be elevated by the crane, a combined drag and suspension bar connected with the scraper, and a trigger for the said bar released from locking engagement therewith by contact with the said trip arms.

10. In a ditching machine, the combination with a crane and its hoisting rope, of a scraper or shovel provided with a combined suspension and drag bar pivotally attached to its rear portion, the said bar having bearing surfaces produced therein, and a trigger bail pivotally connected with the scraper or shovel adapted for engagement with the outer bearing surface when the shovel or scraper is elevated, and adapted for engagement with the inner bearing surface when the shovel is dumped, and trip arms extending from the jib of the said crane adapted for engagement with the said trigger bail to carry it automatically from its first named to its second named position.

11. In a ditching machine, the combination with a shovel or scraper, of a combined suspension and drag bar pivoted to the rear portion thereof, the said bar being provided with a bearing surface adjacent each of its ends, and a trigger bail pivotally attached to the said shovel or scraper and adapted for engagement with either of the said bearing surfaces of the said combined suspension and drag bar.

12. In a ditching machine, a frame having transverse guideways at its top and bottom, a crane having its mast slidably mounted in the guideways, and means for locking the mast in position in said guideways.

In testimony whereof I have signed my name to this specification in the presence of two subscribing witnesses.

LEVI THORTVEDT.

Witnesses:
   THOMAS TORSON,
   FRED O. SCHLIPF.